April 27, 1948.   W. F. EISENSMITH   2,440,331
SAFETY OILING MEANS FOR CAR JOURNALS
Filed Oct. 4, 1944   2 Sheets-Sheet 1
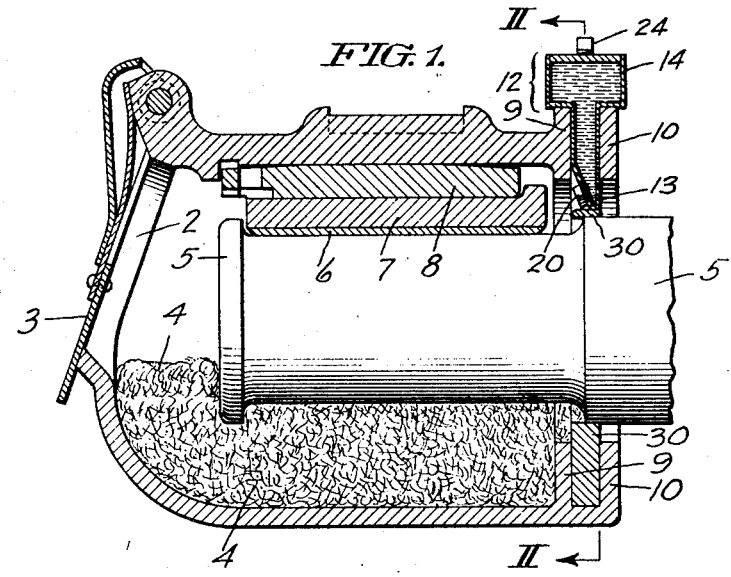
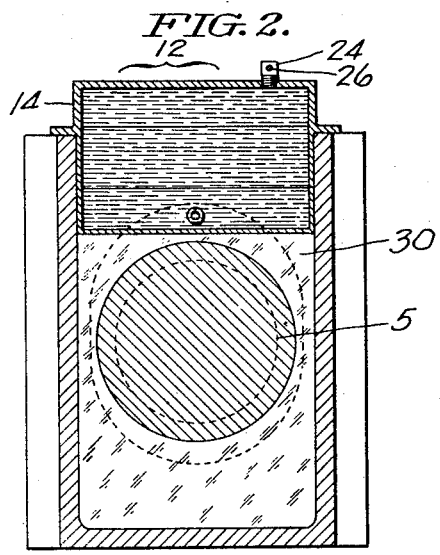
WITNESSES
INVENTOR:
William F. Eisensmith,
BY
ATTORNEYS.

April 27, 1948. W. F. EISENSMITH 2,440,331
SAFETY OILING MEANS FOR CAR JOURNALS
Filed Oct. 4, 1944 2 Sheets-Sheet 2
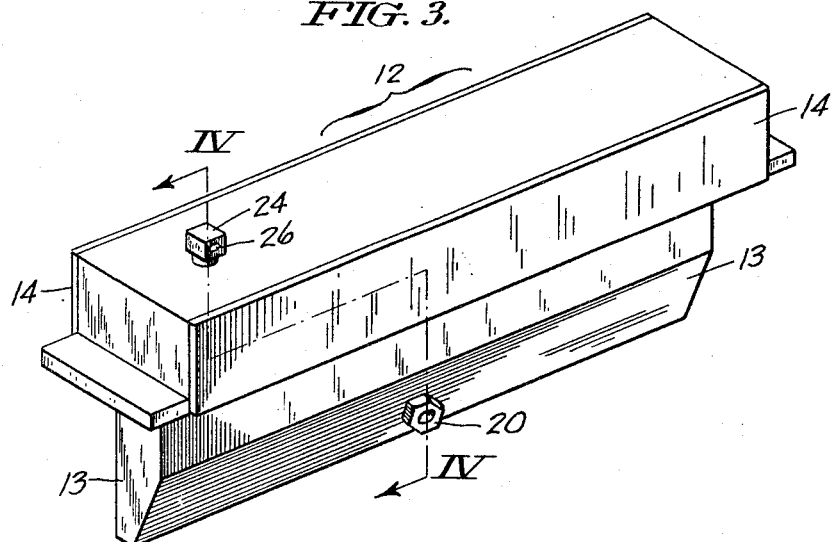
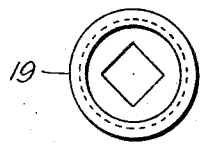
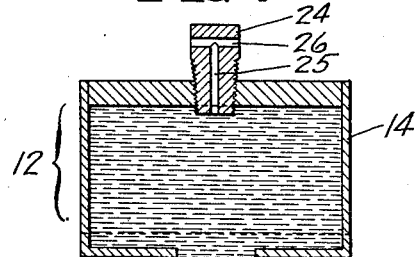
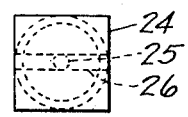
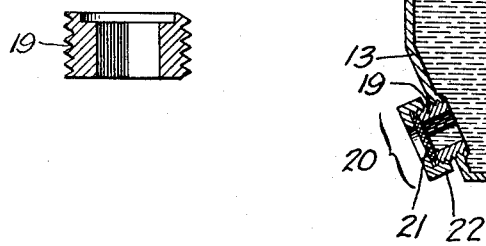
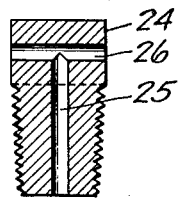
WITNESSES
Thomas W. Kerr, Jr.
Herbert Fuchs
INVENTOR:
William F. Eisensmith,
BY Paul & Paul
ATTORNEYS.

Patented Apr. 27, 1948

2,440,331

UNITED STATES PATENT OFFICE 2,440,331

SAFETY OILING MEANS FOR CAR JOURNALS

William F. Eisensmith, Penns Grove, N. J.

Application October 4, 1944, Serial No. 557,176

2 Claims. (Cl. 308—79)

1

The object of my invention is to provide in a suitable and convenient location an auxiliary oil reservoir provided with an outflow aperture closed by a fusible plug in such near relation to the bearing surfaces in the journal box of a railway truck that when said surfaces become overheated to an improper extent the heat melts the fusible material releasing a supply of oil which lubricates the bearing surfaces, overcoming the heat which has been generated by friction, and preventing the undesirable results of a hot box.

I am aware that other inventors have devised other means whereby the occurrence of a hot box releases a supply of oil from an auxiliary oil reservoir to accomplish immediate lubrication, but such prior means have involved an oil reservoir and connections so related to the journal box and particularly to the removable bearing brass as to interfere with oiling or re-packing of the box, replacement of the brass bearing, or withdrawal of the axle. By my invention I have been able to overcome difficulties which have been found to exist in previous devices of this sort, and have provided the requisite auxiliary reservoir with a fusible releasing plug sufficiently near the bearing surfaces but so constructed and seated in the journal box as not to interfere with any of the usual operations which take place when the journal box is opened for the addition of oil or oil carrying waste, or for the adjustment of or removal of the brasses, operations which must frequently be performed and which must not be lengthy or difficult. I have also found how to place the fusible oil release in such relation to the bearing surfaces as to be immediately and readily responsive to any undue temperature of these bearing surfaces.

In the accompanying drawings:

Fig. 1 is a vertical section of a journal box of usual construction having my invention applied to it.

Fig. 2 is a vertical cross-section of the box taken along the lines II—II of Fig. 1.

Fig. 3 is a perspective view of my auxiliary oil reservoir.

Fig. 4 is a vertical section of the same taken along the line IV—IV of Fig. 3.

Figs. 5 and 6 are views of the fusible oil release plug and

Figs. 7 and 8 are views of the closure for the oil supply aperture of the auxiliary reservoir with air tube capable of admitting air as oil flows out of the emergency exit.

Referring to Figs. 1 and 2, the journal box is of usual construction and is provided with the customary frontal access opening 2 with its cover 3. The journal box is capacious enough to hold the required amount of oil and oiled waste 4 in contact with the lower side of the axle 5 which rotates in bearing contact with the bearing brass 6 having an auxiliary surfacing 7 and held in place by the usual wedge 8. The inner side of the journal box has two walls 9 and 10 between which is the space for the usual dust guard which prevents exposure of the interior of the journal box to dust which might otherwise enter. I have not described these parts of the journal box in detail because their construction is well known, but it will be noticed that the reduced bearing surface of the axle reaches a little nearer the center of the truck than usual, so as to enlarge the path by which heat from the bearing surfaces may be radiated.

I will now describe the special auxiliary oil reservoir 12 which I have provided to accomplish the purpose of my invention. It has a lower part 13 which passes down within the upper part of the space between the double walls of the journal box taking to this extent the place of the dust guard, but the upper part 14 of the reservoir rests upon the journal box just above this space. The reservoir is shaped to be thus accommodated as shown in detail in Figs. 3 and 4, its upper part 14 having length and breadth sufficient to rest upon the top of the journal box whereon it is placed; while its smaller depending part 13 reaches down into the space between the double walls of the inner side of the journal box. These two parts constitute but one reservoir which is provided with a fusible closure 20 consisting of a short tube 19 screwed into the wall of the reservoir on the side (preferably inclined) which faces the bearing surfaces of the journal box. The tube is held in place by a screw threaded engagement in the wall. The outer end of the tube is closed by a fusible metal sheet 21 held in place by the screw cap 22 screwed upon the outer end of the tube 19. The central part of this screw cap is apertured to expose the fusible metal sheet to heat radiated from the bearing surfaces of the axle and bearing brass. The fusible closure is so situated that no part of the journal box interferes with the direct radiation of this heat to its exposed surface.

The top of the auxiliary oil reservoir is provided with a screw fitting plug 24, sufficiently shown in the drawings, and peculiar only in that it possesses an open axial air tube 25 meeting a similar cross tube 26 near the top of the plug. The dust guard 30 is of usual construction except that it is cut away at the top to permit the descent of the oil reservoir far enough to expose the fusible closure.

In operation, the air tube 25 which has just been described being always open permits the necessary influx of air into the auxiliary oil reservoir to allow the oil which it contains to escape from the fusible closure when that is vented by melting of the fusible plug or sheet. The aperture of the closure 20 may be made of proper size to regulate as desired the rate at which oil escapes when the fusible element is melted. The heat from overheated bearing surfaces of the journal box is not only directly radiated against the exposed surface of the fusible element but also is transmitted to it by the screw cap which holds it in place and which is itself exposed to such heat and conductive of the same.

If desired the oil in the auxiliary reservoir may be colored by a suitable pigment so that its escape may be noted. The advantage of my invention over previous devices for accomplishing the same general end is the provision of an oil reservoir so situated that its fusible closure is in a position capable of directly receiving heat radiated from overheated bearing surfaces. No transmitting connections are required. The reservoir and its fusible plug are so situated that no part of them interferes in any wise with the ordinary operations performed in or about a journal box such as the addition of oil or oil waste, cleaning it out, the removal or replacement of bearings, or the withdrawal of the axle. The placing of this auxiliary reservoir so that it discharges to the rear of the journal box instead of elsewhere facilitates the quick distribution of its oil throughout the entire friction surface of the axle and bearings.

Having thus described my invention, I claim:

1. The combination with a car axle journal box having an opening in an end wall through which the journal extends, and a transversely arranged open top slot adjacent said end wall for reception of a dust guard; of an emergency oil supply means comprising a reservoir with a relatively wide upper portion adapted to be supported externally of the top of the box, and a narrower pendent portion conformative with and snugly fitting into the upper part of the slot above the dust guard, and a fusible plug normally closing a lateral drain orifice in the pendent portion of the reservoir near the bottom and adapted upon melting, when the box becomes over-heated, to permit discharge of the reserve oil inwardly of the box over the journal.

2. The invention according to claim 1, wherein the pendent portion of the reservoir has a bevel along its inner bottom edge, and wherein the drain opening is located in said bevel.

WILLIAM F. EISENSMITH.

REFERENCES CITED

The following references are of record in the file of this patent:

UNITED STATES PATENTS

| Number | Name | Date |
|---|---|---|
| 477,319 | Wilxon | June 21, 1892 |
| 1,724,919 | Fenske | Aug. 20, 1929 |
| 1,947,470 | Hall | Feb. 20, 1934 |
| 1,979,875 | Faus | Nov. 6, 1934 |

FOREIGN PATENTS

| Number | Country | Date |
|---|---|---|
| 91,449 | Switzerland | Nov. 1, 1921 |